(12) United States Patent
Testa et al.

(10) Patent No.: US 11,840,139 B2
(45) Date of Patent: Dec. 12, 2023

(54) CAP WITH VALVE SYSTEM PROVIDED WITH FLOW REDUCER

(71) Applicant: CEV LAB S.R.L., Lainate (IT)

(72) Inventors: Giuseppe Testa, Cetraro (IT); Emanuele Belpanno, Carpi (IT); Luca Di Palma, Carpi (IT)

(73) Assignee: CEV LAB S.R.L., Lainate (IT)

( * ) Notice: Subject to any disclaimer, the term of this patent is extended or adjusted under 35 U.S.C. 154(b) by 0 days.

(21) Appl. No.: 17/742,762

(22) Filed: May 12, 2022

(65) Prior Publication Data

US 2022/0371432 A1 Nov. 24, 2022

(30) Foreign Application Priority Data

May 19, 2021 (IT) .................. 102021000012989

(51) Int. Cl.
*B60K 15/035* (2006.01)
*B60K 15/04* (2006.01)
*B60K 15/03* (2006.01)
*F16K 17/36* (2006.01)

(52) U.S. Cl.
CPC ........ *B60K 15/035* (2013.01); *B60K 15/0406* (2013.01); *B60K 2015/03296* (2013.01); *B60K 2015/03547* (2013.01); *B60K 2015/03585* (2013.01); *F16K 17/36* (2013.01); *Y10T 137/0874* (2015.04)

(58) Field of Classification Search
CPC ........ Y10T 137/0874; Y10T 137/0923; B60K 15/03519
See application file for complete search history.

(56) References Cited

U.S. PATENT DOCUMENTS

| 1,852,558 | A | * | 4/1932 | Dunzweiler | ........ H01M 50/308 429/85 |
| 2,684,683 | A | * | 7/1954 | Brown | ............... B60K 15/0406 251/263 |
| 4,351,350 | A | * | 9/1982 | Crute | ...................... F16K 17/36 220/203.02 |
| 4,390,107 | A | * | 6/1983 | Hukuta | .............. B60K 15/0409 220/303 |
| 4,646,772 | A | * | 3/1987 | Bergsma | ................. F16K 17/36 137/39 |
| 5,004,002 | A | * | 4/1991 | Kobayashi | ....... B60K 15/03519 137/39 |

(Continued)

FOREIGN PATENT DOCUMENTS

JP 2002019477 A 1/2002

*Primary Examiner* — Robert K Arundale
(74) *Attorney, Agent, or Firm* — Pearne & Gordon LLP; J. Gregory Chrisman

(57) ABSTRACT

A fluid vent valve (1) for a fuel tank, comprising: a valve body (10) having an inlet opening connected or connectable to a tank, an outlet opening and a main chamber (13) interposed between said inlet opening and said outlet opening (12); a piston (20) inserted or insertable in the main chamber (13) and movable therein so as to define a closed configuration and an open configuration; a pendulum (30) hinged to the valve body (10) and coupled to the piston (20) so as to promote a movement of the piston (20) between the two configurations; a flow reducer (40) operatively interposed between the outlet opening (12) and the piston (20).

8 Claims, 2 Drawing Sheets

(56) References Cited

U.S. PATENT DOCUMENTS 5,924,438 A * 7/1999 Cimminelli ............. F16K 17/04
                                                            137/39
5,944,044 A * 8/1999 King .................... F16K 24/044
                                                           137/202
6,142,167 A * 11/2000 Pettesch ................. F16K 24/04
                                                            137/39

* cited by examiner

CAP WITH VALVE SYSTEM PROVIDED WITH FLOW REDUCER

The present invention relates to a vent valve for a motorcycle tank and to a cap for closing tanks comprising such a vent valve.

Motorcycle tanks are known, which include a first valve, normally open and associated with a symmetrical pendulum which, in the event of overturning, interrupts the passage to the outside or into the canister if provided.

In addition, it is also known to provide a second valve, normally closed, which includes a spring pressing on a spherical cap, which opens in the event of overpressure.

Although consolidated, this known solution suffers from some limits, which are illustrated below.

Especially in the case of a tank full of fuel, it can occur that during steep descents or in the event of sudden braking and acceleration or when travelling around sharp bends, fuel leaks through the valve which pours into the canister, if any, in excessive amounts or ends up directly on the road, if the vehicle is not provided with a canister.

In this context, the technical task underpinning the present invention is to provide a vent valve for tanks and a cap comprising such valve which overcome the mentioned drawbacks.

The indicated objects are achieved by a vent valve and a cap for tanks comprising such a vent valve according to what is described in the appended claims.

Further characteristics and advantages of the present invention will appear more clearly from the detailed description of some preferred, but not exclusive, embodiments of a vent valve and a cap for tanks comprising such vent valve illustrated in the appended drawings, wherein.

Figure 2:
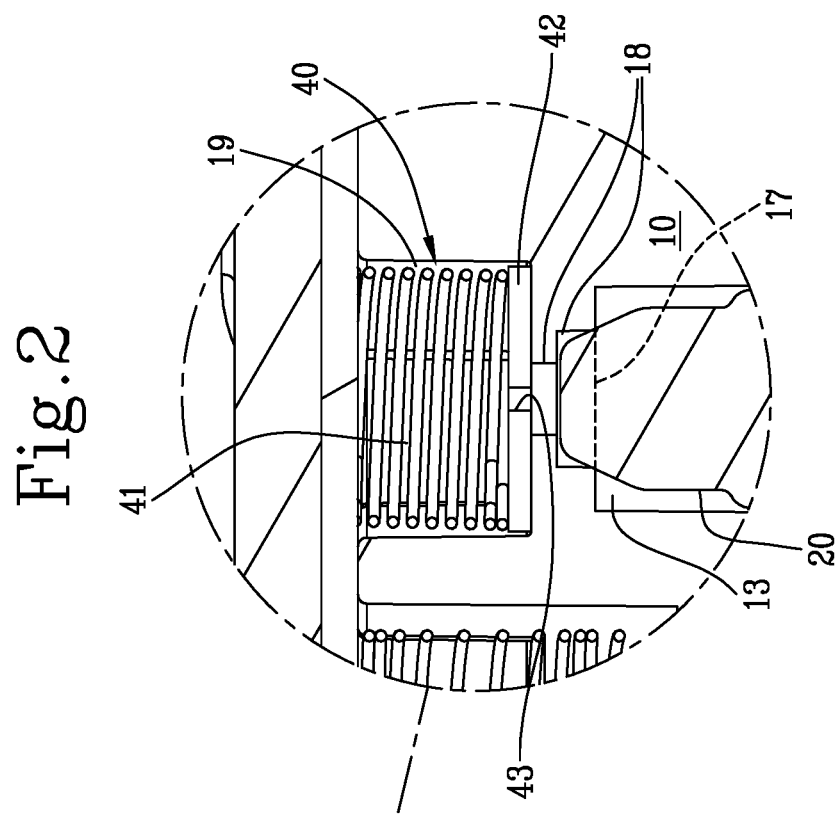
FIG. 2 shows an enlarged detail K of FIG. 1.

With reference to the cited figures, reference numeral "1" denotes in its entirety a vent valve for a motorcycle tank according to the present invention.

The invention also relates to a cap 100 for closing tanks comprising the valve 1.

The vent valve 1 comprises a valve body 10 having an inlet opening 11 connected or connectable to a tank, and an outlet opening 12.

In particular, the outlet opening 12 can be connected to a canister or can be in fluid communication directly with the environment outside the tank.

The valve body 10 has at least one main chamber 13, interposed between the inlet opening 11 and the outlet opening 12.

In other words, in the valve body 10 there is at least one main chamber 13 defining a containment volume "V" and adapted to place in fluid communication the inlet opening 11 with the outlet opening 12.

The valve 1 comprises a piston 20 inserted or insertable in such main chamber 13.

Figure 1:
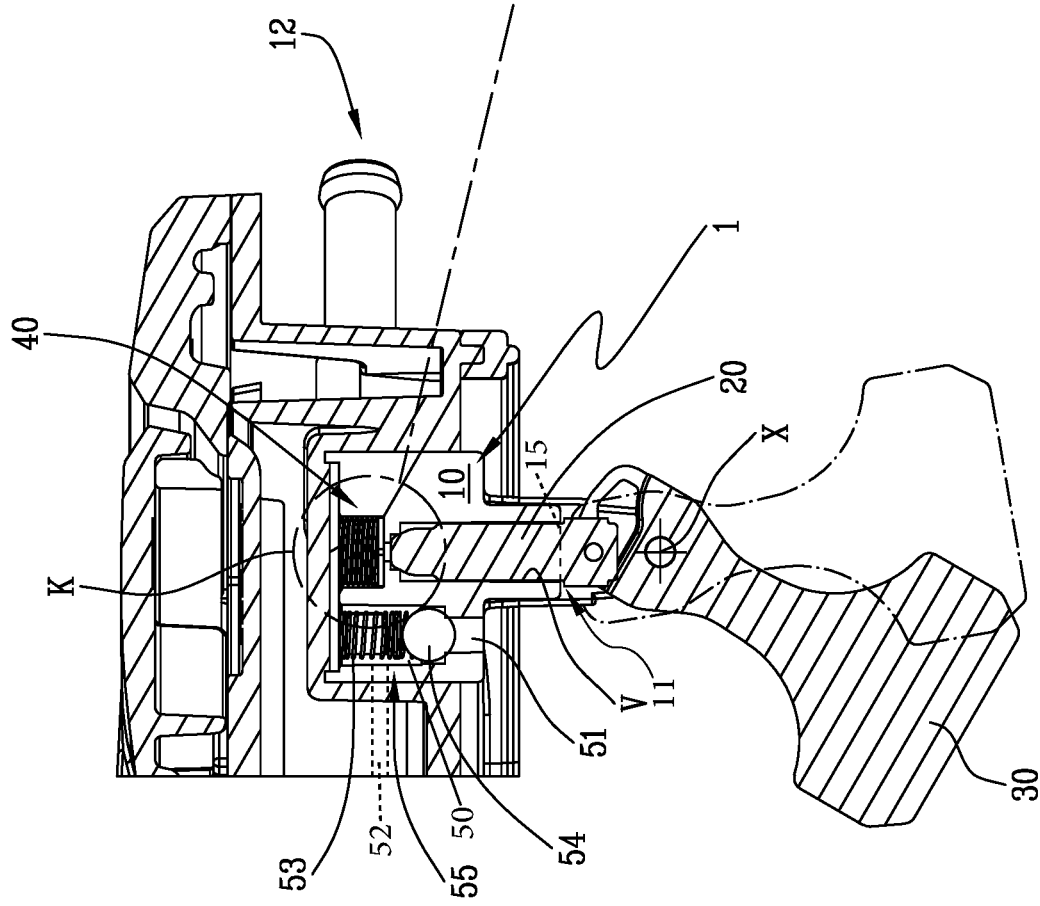
FIG. 1 shows a schematic side view of a cross section of a preferred embodiment of a vent valve in accordance with the present invention.
Figure 3:
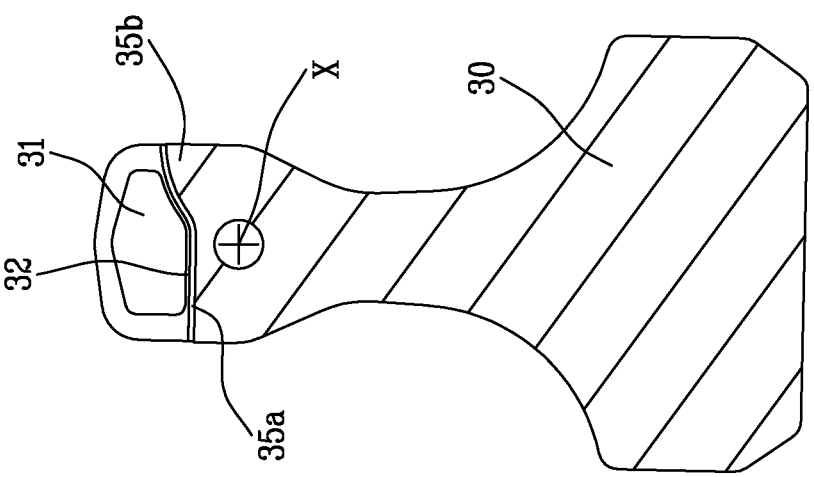
FIG. 3 shows a further detail of the embodiment of the vent valve of FIG. 1.

According to a preferred embodiment, illustrated in FIGS. 1, 2 and 3, the main chamber 13 has a lower opening 15 in which the piston 20 is inserted or insertable.

Furthermore, the main chamber 13 has an upper opening 17 which enables the passage of fluid from the chamber 13 itself to the outside.

The piston 20 is movable inside the main chamber 13 so as to define a closed configuration, wherein the piston 20 occludes the upper opening 17, and an open configuration wherein the inlet opening 11 and the outlet opening 12 are in fluid communication.

Preferably, the piston 20 is movable along a linear trajectory inside the main chamber 13. In other words, the piston 20 performs a translation movement inside the main chamber 13 between the closed configuration and the open configuration and vice versa.

The valve 1 further comprises a pendulum 30 hinged to the valve body 10 and coupled to the piston 20 so as to promote the movement of the piston 20 from the open configuration to the closed configuration and vice versa as a function of an orientation assumed by the pendulum 30.

In other words, the pendulum 30 is configured to move the piston 20 as a function of a predetermined oscillation angle assumed by the pendulum 30 which is free to rotate about an axis of rotation "X".

Therefore, the pendulum 30 is freely hinged to the valve body 10 so as to rotate about the axis of rotation "X".

In other words, whenever the vehicle on which the valve 1 is installed changes orientation with respect to a perpendicular to the ground, the pendulum 30 would be free to rotate about the axis "X" in such a way that it can be substantially parallel to the perpendicular to the ground.

The pendulum 30 is also forcibly connected to the piston 20 in both movement directions of the piston 20 itself.

According to a further aspect, the pendulum 30 is preferably mounted on the tank so that the movement direction of the pendulum 30 is inclined by 45° with respect to the movement direction of the vehicle.

Preferably, the valve 1 is oriented so that the closing angle is the same whether the vehicle is inclined forwards or to the right of the direction of travel of the vehicle and so that it is the same whether the vehicle is inclined backwards or to the left of the direction of travel of the vehicle.

Figure 4:
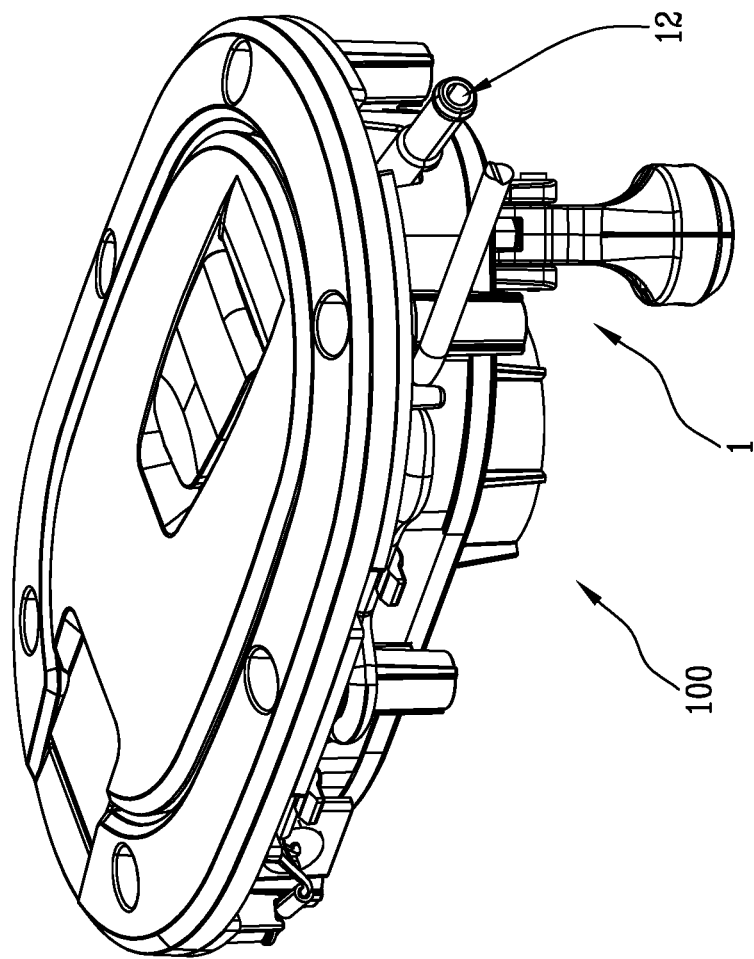
FIG. 4 shows a perspective view of a preferred embodiment of a cap for tanks comprising the vent valve of FIG. 1.

As illustrated in detail in FIGS. 1 and 4, the pendulum 30 can have, at the upper end, a cam 31 and the piston 20 can comprise a lower portion 21 hinged in such cam 31.

According to a preferential aspect of the present invention, the cam 31 has a lower abutment surface 32 with a substantially asymmetrical conformation with respect to a longitudinal axis passing through a centre of the pendulum 30.

In other words, as can be clearly inferred from FIG. 3, the profile of the lower abutment surface 32 of the cam 31 is substantially asymmetrical, and has a rectilinear part 35$a$ and a convex curved part 35$b$, shaped like a bump, defining as a whole an S-shaped profile.

Advantageously, with this conformation, the lower abutment surface 32 defines an asymmetrical pendulum 30; in fact, the maximum oscillation of the pendulum 30 will in this way be a function of the inclination direction of the vehicle with respect to the direction of travel.

Advantageously, any leakage of petrol in the event of a substantially full tank and in the event of the vehicle being on a steep downhill stretch or even in the event of "aggressive" driving that can cause the fuel inside the tank to sway is notably limited.

In other words, the leakage of liquid fuel in all those situations in which the fuel is subject to strong oscillation or fluctuation inside the tank is substantially prevented.

Preferably, the surface 32 of the cam 31 is shaped so that the pendulum 30 can oscillate up to an angle comprised between 7° and 12° if the vehicle is inclined forwards or to the right with respect to the direction of travel and in any case so that the pendulum 30 can oscillate up to an angle comprised between 27° and 33° if the vehicle is inclined backwards or to the left with respect to the direction of travel.

Even more preferably, the lower abutment surface 32 is shaped so that the pendulum 30 can oscillate up to an angle of 9.8° if the vehicle is inclined forwards or to the right with respect to the direction of travel and in any case so that the pendulum 30 can oscillate up to an angle of 30° if the vehicle is inclined backwards or to the left with respect to the direction of travel. According to a peculiar aspect of the present invention, the valve 1 comprises a flow reducer 40 operatively interposed between the outlet opening 12 and the piston 20.

More precisely, the invention envisages providing a reserve chamber 19, in which the flow reducer 40 can slide, arranged above the main chamber 13 and connected thereto through a passage 18 that defines the aforesaid upper opening 17 of the main chamber 13.

Structurally, as shown in FIGS. 2 and 3, the flow reducer 40 can comprise an elastically deformable element 41, preferably a spring, and an obstruction element 42, coupled to the elastically deformable element 41 and slidably inserted into the main chamber 13.

Preferably, the obstruction element 42 is a plate-shaped element having a hole 43 and could have a size and shape such as to define on the circumference or perimeter a coupling with the lateral surface of the reserve chamber 19.

Advantageously, as will become clearer in the following description, the flow reducer 40 enables the undesired leakage of liquid fuel from the tank to be further reduced. In the event of a stationary state of the vehicle, or in general of the tank, the pendulum 30 is substantially stopped and oriented substantially parallel to the piston 20. The piston 20 is in the open configuration while the hole 43 of the flow reducer 40 guarantees the passage of vapour and/or gas from the inlet opening to the outlet opening 12 and vice versa.

In the event of overturning, the pendulum 30 causes a movement of the piston 20 which is displaced upwards and closes the upper opening 17, thus preventing the passage of fuel from the inlet opening to the outlet opening 12 and vice versa.

In fact, in the closed configuration of the piston 20, the passage 18 between the main chamber 13 and the reserve chamber 19 is plugged by the upper end of the piston 20 itself.

As shown in FIG. 2, such passage 18 can be constituted by a succession of circular through holes with different diameters, e.g. two, and preferably with a decreasing diameter in the direction of the reserve chamber 19; other embodiments in which the passage is a single cylindrical hole or one or more holes with tapered dimensions towards the reserve chamber 19, also without a circular shape, are not excluded.

However, in the event of strong dynamic strain, such as a sudden change of speed and/or orientation, the reducer 40 chokes the flow of fuel which would tend to leak out and, as the pressure of the fuel overcomes the force of the spring 41, the fuel itself is temporarily stored in the reserve chamber 19, before returning downwards by gravity along the aforesaid passage 18.

The dimensions of the hole 43 are selected so as to reduce as much as possible the amount of fuel that could leak through the valve 41 and at the same time maintain the right ventilation efficiency, i.e. enable sufficient flow communication through the valve 41 that allows venting and does not create a vacuum in the main chamber 13, to prevent the tank from remaining without oxygen.

In the preferred embodiment of the valve 1, the elastically deformable element 41 keeps the obstruction element 42 in the lowered position until the pressure difference between the inlet opening 11 and the outlet opening 12 has a lower value than a first threshold, which can for example be comprised between 10 and 20 mbar.

When the pressure difference between the inlet opening 11 and the outlet opening 12 exceeds such value, the force exerted by the gas on the obstruction element 42 causes a movement thereof towards the raised position by a magnitude proportional to the pressure difference between the inlet opening 11 and the outlet opening 12.

Preferably, the obstruction element 42 reaches the raised position by a value of the pressure difference between the inlet opening 11 and the outlet opening 12 which exceeds a second threshold, e.g. equal to 80 mbar.

According to a further aspect of the present invention, the valve body 10 can have a secondary inlet opening 51, connected or connectable to the tank, and a secondary outlet opening. The valve body 10 can also have a secondary chamber 50 interposed between the secondary inlet 51 and the secondary outlet and comprising a device 55 for controlling the pressure of the tank.

In practice, such control device 55 defines a "second valve" designed to open in the event of overpressure.

In other words, such pressure control device 55 is configured to enable the passage of fluid as a function of a certain pressure difference value between the secondary inlet opening 51 and the secondary outlet opening 52.

According to a preferred embodiment, the pressure control device 55 comprises a secondary elastically deformable element 53, preferably a spring, and a secondary obstruction element 54, coupled to the secondary elastically deformable element 53 and slidably inserted into the secondary chamber 50 so as to define a closed configuration, in which the secondary obstruction element 54 obstructs the secondary inlet opening 51 or the secondary outlet opening 52, and an open configuration in which the secondary inlet opening 51 and the secondary outlet opening 52 are in fluid communication.

Preferably, the pressure control device 55 is configured to guarantee the closed configuration for a value of pressure difference between the secondary inlet opening 51 and the secondary outlet opening 52 lower than a first threshold, e.g. equal to 17 kPA, beyond which the pressure control device 55 is moved towards the open configuration.

Furthermore, the pressure control device 55 is configured to reach the open configuration for a value of pressure difference between the secondary inlet opening 51 and the secondary outlet opening 52 greater than a second threshold, e.g. equal to 27 kPA, to then fully open when a third threshold is exceeded, e.g. equal to 45 kPa.

The invention claimed is:

1. A fluid vent valve for a fuel tank, comprising:
   a valve body having an inlet opening connected or connectable to a tank, and an outlet opening, said valve body having at least one main chamber interposed between said inlet opening and said outlet opening;
   a piston inserted or insertable in said main chamber and movable inside said main chamber so as to define a closed configuration, wherein said piston occludes a passage between said inlet opening and said outlet opening, and an opening configuration wherein said inlet opening and said outlet opening are in fluid communication;

a pendulum hinged to said valve body and coupled to said piston so as to promote a movement of said piston from said open configuration to said closed configuration and vice versa as a function of an orientation assumed by said pendulum, wherein said pendulum has a cam and wherein said piston comprises a lower portion hinged in said cam; and characterised in that it comprises a flow reducer operatively interposed between said outlet opening and said piston.

2. The valve according to claim 1, wherein said flow reducer comprises an elastically deformable element, and an obstruction element, coupled to said elastically deformable element and slidably inserted into a reserve chamber connected to said main chamber.

3. The valve according to claim 2, wherein said obstruction element is made in the form of a plate-shaped element provided with a hole.

4. The valve according to claim 1, wherein said cam has a lower abutment surface with a substantially asymmetrical conformation with respect to a longitudinal axis passing through a centre of said pendulum.

5. The valve according to claim 4, wherein said lower abutment surface has at least two portions asymmetrical with respect to said longitudinal axis passing through the centre of said pendulum.

6. The valve according to claim 1, wherein said valve body has a secondary inlet opening, connected or connectable to said tank, and a secondary outlet opening; said valve body having a secondary chamber interposed between said secondary inlet opening and said secondary outlet opening and comprising a device for controlling the pressure of said tank; said pressure control device being configured to enable the passage of fluid as a function of a determined value of said pressure difference between said secondary inlet opening and said secondary outlet opening.

7. A cap for closing a tank comprising the vent valve according to claim 1.

8. The valve according to claim 2, wherein said elastically deformable element is a spring.

* * * * *

UNITED STATES PATENT AND TRADEMARK OFFICE
CERTIFICATE OF CORRECTION

PATENT NO. : 11,840,139 B2
APPLICATION NO. : 17/742762
DATED : December 12, 2023
INVENTOR(S) : Testa et al.

It is certified that error appears in the above-identified patent and that said Letters Patent is hereby corrected as shown below:

In the Claims

In Column number 5, Line number 8, being Line 20 of Claim 1, please delete "characterised in that it comprises"

Signed and Sealed this
Eleventh Day of June, 2024

Katherine Kelly Vidal
*Director of the United States Patent and Trademark Office*